April 12, 1932. A. MEYER 1,853,133
METHOD OF COOLING EXHAUST GAS TURBO BLOWERS FOR DIESEL ENGINES
Filed Dec. 27, 1927
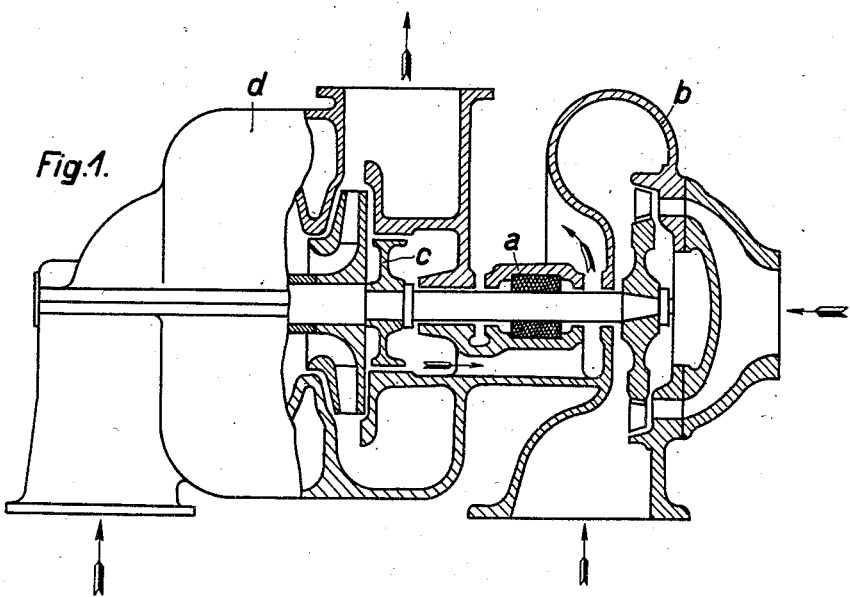
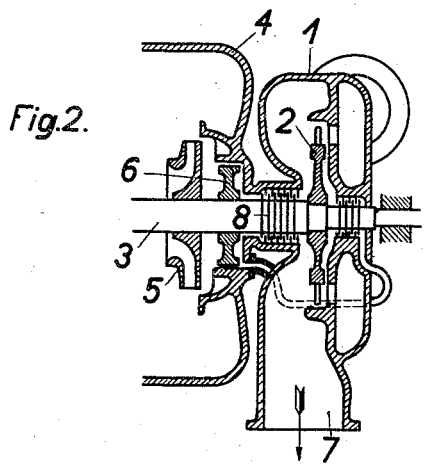

Patented Apr. 12, 1932

1,853,133

UNITED STATES PATENT OFFICE

ADOLF MEYER, OF KUSNACHT, NEAR ZURICH, SWITZERLAND, ASSIGNOR TO AKTIEN-GESELLSCHAFT BROWN, BOVERI AND CIE., OF BADEN, SWITZERLAND

METHOD OF COOLING EXHAUST GAS TURBO-BLOWERS FOR DIESEL ENGINES

Application filed December 27, 1927, Serial No. 242,840, and in Switzerland December 30, 1926.

For driving the charging and scavenging air blowers of internal combustion engines gas turbines are frequently employed, which are driven with the exhaust gases from the Diesel engine. These exhaust gases have temperatures according to the load, which may exceed 500°. For this reason it is necessary to cool the bearings, glands, shafts and, in some cases, the bearing pedestals of such turbines, more particularly when the gas turbine, as is frequently the case, is flanged to the casing of the blower without other support and has a common bearing with the blower. Thus, for instance, water has been employed for such cooling. The provision of water has, however, often caused difficulties. Only clean water may be used for cooling, as otherwise, owing to the high temperatures, there will be heavy deposits. Frequently such water is not available, as the Diesel engines are, as is well known, used more particularly in regions which are deficient in water supply. On locomotives as well, there may be a lack of water. Hence, a further advantage is provided by the proposal to use air instead of water for cooling purposes, that is, air conveyed by the blower, which has however been obtained from the delivery side and therefore entails a loss in output.

A particularly advantageous manner of cooling is provided according to the invention, by using the waste air from the balancing piston of the blower, as this air is in any case lost.

The invention will now be described by way of example with reference to the accompanying drawings, wherein:

Figure 1 represents a sectional view of a gas turbine blower combination embodying the invention.

Figure 2 is a sectional view of a similar combination modified so that the waste air from the balancing piston enters the gas turbine casing directly along the shaft.

According to Figure 1 the bearing $a$ of the gas turbine $b$ is cooled by air which flows from the balancing piston $c$ of the blower $d$.

This waste air from the balancing piston may also be caused to enter the casing of the gas turbine directly along the shaft, so that no glands are required at this point for the blower and the gas turbine, as is shown by way of example in Figure 2. Around the shaft 3 from the turbine wheel 2 to the blower casing 4 a closed space is formed so that the cooling air can no longer escape into the open, as heretofore, but passes from this space along the shaft into the casing 1 of the gas turbine, leaving the latter along with the waste gases of the turbine, through the exhaust pipe 7. By this means not only is the cooled part of the shaft made longer and the heated part shorter, but, by mixing, the temperature in the casing of the turbine is also reduced, thus causing the shaft to be further cooled. This also does away with one of the glands and prevents the undesirable escape of the hot gases out of the gas turbine along the shaft. For this purpose it is only necessary to maintain in the cooling space a pressure slightly above that of the atmosphere, which is somewhat greater than the exhaust pressure of the gas turbine which normally exhausts into the open. For increasing the cooling action and reducing the quantity of air required for cooling, the shaft may, as shown, be provided with ribs 8 between which opposing ribs of the casing engage for lengthening the path of the air and increasing the velocity of the air, for the purpose of increasing the transmission of heat.

For this cooling, just as in the example shown in Figure 1, the waste air from the balancing piston 6 of the blower is used. In combinations having two bearings, such as that shown in Figure 2, this enables the machine to be still further shortened, as the blower and the gas turbine may be made integral with one another, both the gland of the blower and that of the gas turbine being done away with and the air which leaks past the balancing piston being capable of flowing directly along the shaft into the casing of the gas turbine.

Having now described my invention, what I claim as new and desire to secure by Letters Patent is:—

1. A method of cooling exhaust gas turbo-blowers furnished with a balancing piston which consists in conveying waste air from the said balancing piston to the said gas turbine as and for the purpose described.

2. Means for cooling parts of a gas turbo-blower including a single shaft carrying both gas turbine and blower, a balancing piston on said shaft associated with said blower and a duct conducting waste air from the low pressure side of said balancing piston past the parts to be cooled.

3. Means for cooling parts of a gas turbo-blower as claimed in claim 2 including a single casing housing both the gas turbine and the blower with its balancing piston, the said duct being formed between the shaft and the casing and extending from the balancing piston of the blower to the gas turbine.

4. Means for cooling parts of a gas turbo-blower as claimed in claim 2 including a single casing housing both the gas turbine and the blower with its balancing piston, the said duct being formed between the shaft and the casing and extending from the balancing piston of the blower to the gas turbine, outwardly projecting rings on the shaft coacting with inwardly projecting rings on the casing to form a labyrinthine duct and thus increase the effective length of the waste air path through the said duct.

In testimony whereof I have signed my name to this specification.

ADOLF MEYER.